(12) United States Patent
Goodrich et al.

(10) Patent No.: US 12,347,013 B2
(45) Date of Patent: *Jul. 1, 2025

(54) ANIMATED CUSTOM STICKER CREATION

(71) Applicant: Snap Inc., Santa Monica, CA (US)

(72) Inventors: Kyle Goodrich, Venice, CA (US); Christie Marie Heikkinen, Sherman Oaks, CA (US); Pedram Javidpour, Los Angeles, CA (US); Andrew James McPhee, Culver City, CA (US); Daniel Moreno, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,370

(22) Filed: May 15, 2024

(65) Prior Publication Data

US 2024/0303894 A1 Sep. 12, 2024

Related U.S. Application Data

(63) Continuation of application No. 17/514,314, filed on Oct. 29, 2021, now Pat. No. 12,020,358.

(51) Int. Cl.
*G06T 13/40* (2011.01)
*G06F 3/0482* (2013.01)
(Continued)

(52) U.S. Cl.
CPC ............ *G06T 13/40* (2013.01); *G06F 3/0482* (2013.01); *G06T 11/60* (2013.01); *G06T 13/80* (2013.01); *H04L 51/10* (2013.01); *G06T 2200/24* (2013.01)

(58) Field of Classification Search
None
See application file for complete search history.

(56) References Cited

U.S. PATENT DOCUMENTS 5,880,731 A 3/1999 Liles et al.
6,023,270 A 2/2000 Brush, II et al.
(Continued)

FOREIGN PATENT DOCUMENTS

CN 1407447 A 4/2003
CN 109863532 A 6/2019
(Continued)

OTHER PUBLICATIONS

"U.S. Appl. No. 15/929,355, Examiner Interview Summary mailed Jun. 16, 2021", 2 pgs.
(Continued)

*Primary Examiner* — Peter Hoang
(74) *Attorney, Agent, or Firm* — Schwegman Lundberg & Woessner, P.A.

(57) ABSTRACT

Methods and systems are disclosed for performing operations for generating a custom sticker. The operations include receiving, by a messaging application implemented on a first device, an image. The operations include receiving, by the messaging application, input that selects a region of the image. The operations include generating, by the messaging application, a graphical element comprising the region of the image selected by the input. The operations include applying, by the messaging application, one or more visual effects to the graphical element. The operations include causing the graphical element to be animated according to a given animation pattern selected from a plurality of animation patterns to generate an animated custom graphic. The operations include sending the animated custom graphic with the one or more visual effects from the first device to a second device.

20 Claims, 11 Drawing Sheets

(51) Int. Cl.
  *G06T 11/60* (2006.01)
  *G06T 13/80* (2011.01)
  *H04L 51/10* (2022.01)

(56) References Cited

U.S. PATENT DOCUMENTS

| | | |
|---|---|---|
| 6,223,165 B1 | 4/2001 | Lauffer |
| 6,285,381 B1 | 9/2001 | Sawano et al. |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,493,153 B2 | 2/2009 | Ahmed et al. |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,031,210 B2 | 10/2011 | Elsberg et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,498,451 B1 | 7/2013 | Agopian et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,478,006 B2 | 10/2016 | Edwin et al. |
| 9,489,760 B2 | 11/2016 | Li et al. |
| 9,503,845 B2 | 11/2016 | Vincent |
| 9,508,140 B2 | 11/2016 | Su et al. |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,930,225 B2 | 3/2018 | Villmer |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,269,164 B1 | 4/2019 | Song et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 11,217,020 B2 | 1/2022 | Goodrich et al. |
| 11,775,165 B2 | 10/2023 | Goodrich et al. |
| 11,995,757 B2 | 5/2024 | Kwong et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2005/0276477 A1 | 12/2005 | Lin et al. |
| 2006/0001650 A1 | 1/2006 | Robbins et al. |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0063287 A1 | 3/2008 | Klamer et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2010/0321389 A1 | 12/2010 | Gay et al. |
| 2011/0007077 A1 | 1/2011 | Kamath et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0170008 A1 | 7/2011 | Koch |
| 2011/0208716 A1 | 8/2011 | Liu et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |

(56) References Cited

U.S. PATENT DOCUMENTS

| | | |
|---|---|---|
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0115454 A1 | 4/2014 | Li |
| 2014/0125678 A1 | 5/2014 | Wang et al. |
| 2014/0129343 A1 | 5/2014 | Finster et al. |
| 2014/0267117 A1 | 9/2014 | Moll et al. |
| 2015/0042663 A1 | 2/2015 | Mandel et al. |
| 2015/0172246 A1 | 6/2015 | Velummylum et al. |
| 2015/0206349 A1 | 7/2015 | Rosenthal et al. |
| 2015/0213609 A1 | 7/2015 | Lin et al. |
| 2015/0221066 A1 | 8/2015 | Kobayashi |
| 2015/0277686 A1 | 10/2015 | Laforge et al. |
| 2015/0278986 A1 | 10/2015 | Edwin et al. |
| 2015/0346973 A1 | 12/2015 | Shaffer et al. |
| 2015/0371447 A1 | 12/2015 | Yasutake |
| 2016/0062615 A1 | 3/2016 | Price et al. |
| 2016/0080699 A1 | 3/2016 | Scholl et al. |
| 2016/0134840 A1 | 5/2016 | Mcculloch |
| 2016/0139761 A1 | 5/2016 | Grosz et al. |
| 2016/0148428 A1 | 5/2016 | Agarwal et al. |
| 2016/0234149 A1 | 8/2016 | Tsuda et al. |
| 2016/0247309 A1 | 8/2016 | Li et al. |
| 2016/0269645 A1 | 9/2016 | Khoe et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0154466 A1 | 6/2017 | Wu |
| 2017/0199855 A1 | 7/2017 | Fishbeck |
| 2017/0221272 A1 | 8/2017 | Li et al. |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0047200 A1 | 2/2018 | O'Hara et al. |
| 2018/0113587 A1 | 4/2018 | Allen et al. |
| 2018/0115503 A1 | 4/2018 | Baldwin et al. |
| 2018/0197343 A1 | 7/2018 | Hare et al. |
| 2018/0300916 A1 | 10/2018 | Barnett et al. |
| 2018/0314878 A1 | 11/2018 | Lee et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0014884 A1 | 1/2019 | Fu et al. |
| 2019/0057616 A1 | 2/2019 | Cohen et al. |
| 2019/0130620 A1 | 5/2019 | Christiansen et al. |
| 2019/0188920 A1 | 6/2019 | Mcphee et al. |
| 2020/0167995 A1 | 5/2020 | Hare et al. |
| 2020/0252553 A1 | 8/2020 | Luo |
| 2021/0256174 A1 | 8/2021 | Bowen et al. |
| 2021/0287439 A1 | 9/2021 | Goodrich et al. |
| 2022/0076500 A1 | 3/2022 | Goodrich et al. |
| 2022/0109646 A1 | 4/2022 | Lakshmipathy |
| 2022/0263877 A1 | 8/2022 | Conlin et al. |
| 2023/0136013 A1 | 5/2023 | Goodrich et al. |
| 2023/0138677 A1 | 5/2023 | Kwong et al. |
| 2024/0265615 A1 | 8/2024 | Kwong et al. |

FOREIGN PATENT DOCUMENTS

| | | |
|---|---|---|
| CN | 110168478 A | 8/2019 |
| CN | 115485738 A | 12/2022 |
| CN | 118176711 A | 6/2024 |
| CN | 118176712 A | 6/2024 |
| EP | 2184092 A2 | 5/2010 |
| JP | 2001230801 A | 8/2001 |
| JP | 5497931 B2 | 3/2014 |
| KR | 20130138177 A | 12/2013 |
| KR | 20140088752 A | 7/2014 |
| KR | 101445263 B1 | 9/2014 |
| KR | 20150024719 A | 3/2015 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2015123792 A1 | 8/2015 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2021189068 A1 | 9/2021 |
| WO | WO-2023076236 A1 | 5/2023 |
| WO | WO-2023076252 A1 | 5/2023 |

OTHER PUBLICATIONS

"U.S. Appl. No. 15/929,355, Final Office Action mailed Apr. 28, 2021", 15 pgs.

"U.S. Appl. No. 15/929,355, Non Final Office Action mailed Nov. 30, 2020", 13 pgs.

"U.S. Appl. No. 15/929,355, Notice of Allowance mailed Aug. 26, 2021", 8 pgs.

"U.S. Appl. No. 15/929,355, Response filed Feb. 12, 2021 to Non Final Office Action mailed Nov. 30, 2020", 9 pgs.

"U.S. Appl. No. 15/929,355, Response filed Jun. 22, 2021 to Final Office Action mailed Apr. 28, 2021", 11 pgs.

"U.S. Appl. No. 15/929,355, Supplemental Notice of Allowability mailed Dec. 9, 2021", 2 pgs.

"U.S. Appl. No. 17/514,314, Advisory Action mailed Jan. 30, 2024", 3 pgs.

"U.S. Appl. No. 17/514,314, Final Office Action mailed Dec. 19, 2023", 33 pgs.

"U.S. Appl. No. 17/514,314, Non Final Office Action mailed Jul. 20, 2023", 27 pgs.

"U.S. Appl. No. 17/514,314, Notice of Allowance mailed Feb. 16, 2024", 8 pgs.

"U.S. Appl. No. 17/514,314, Response filed Jan. 8, 2024 to Final Office Action mailed Dec. 19, 2023", 11 pgs.

"U.S. Appl. No. 17/514,314, Response filed Oct. 19, 2023 to Non Final Office Action mailed Jul. 20, 2023", 10 pgs.

"U.S. Appl. No. 17/514,370, Advisory Action mailed Aug. 24, 2023", 3 pgs.

"U.S. Appl. No. 17/514,370, Corrected Notice of Allowability mailed Apr. 29, 2024", 4 pgs.

"U.S. Appl. No. 17/514,370, Final Office Action mailed Jun. 23, 2023", 23 pgs.

"U.S. Appl. No. 17/514,370, Non Final Office Action mailed Dec. 23, 2022", 19 pgs.

"U.S. Appl. No. 17/514,370, Notice of Allowance mailed Jan. 23, 2024", 16 pgs.

"U.S. Appl. No. 17/514,370, Notice of Allowance mailed Oct. 2, 2023", 17 pgs.

"U.S. Appl. No. 17/514,370, Response filed Mar. 7, 2023 to Non Final Office Action mailed Dec. 23, 2022", 9 pgs.

"U.S. Appl. No. 17/514,370, Response filed Aug. 11, 2023 to Final Office Action mailed Jun. 23, 2023", 10 pgs.

"U.S. Appl. No. 17/530,181, Non Final Office Action mailed Mar. 14, 2023", 12 pgs.

"U.S. Appl. No. 17/530,181, Notice of Allowance mailed Jun. 28, 2023", 7 pgs.

"U.S. Appl. No. 17/530,181, Preliminary Amendment filed Nov. 18, 2021".

"U.S. Appl. No. 17/530,181, Response filed May 30, 2023 to Non Final Office Action mailed Mar. 14, 2023", 8 pgs.

"Application Serial No. PCT/US2021/070259, International Search Report mailed Jun. 25, 2021", 4 pgs.

"Application Serial No. PCT/US2021/070259, Written Opinion mailed Jun. 25, 2021", 5 pgs.

(56) References Cited

OTHER PUBLICATIONS

"European Application Serial No. 21771332.0, Extended European Search Report mailed Mar. 4, 2024", 10 pgs.

"European Application Serial No. 21771332.0, Response filed Apr. 4, 2024 to Extended European Search Report mailed Mar. 4, 2024", 20 pgs.

"How Does Snapchat Work—Scissors Tutorial", Snapchat, [Online] Retrieved from the Internet: <URL: https://www.howdoesappingwork.com/snapchat/how-does-snapchat-work/what-are-stickers-in-snapchat/scissors/>, (Retrieved on Mar. 9, 2020), 4 pgs.

"inPixio Photo Clip 9", Avanquest, [Online] Retrieved from the Internet: <URL: https://www.inpixio.com/EN/static/lp/photoclip/index.php?filter=LP1_EN_AQMODEL_2&split=A>, (Retrieved Mar. 9, 2020), 10 pgs.

"International Application Serial No. PCT/US2021/070259, International Preliminary Report on Patentability mailed Sep. 29, 2022", 7 pgs.

"International Application Serial No. PCT/US2022/047686, International Preliminary Report on Patentability mailed May 10, 2024", 6 pgs.

"International Application Serial No. PCT/US2022/047686, International Search Report mailed Feb. 14, 2023", 5 pgs.

"International Application Serial No. PCT/US2022/047686, Written Opinion mailed Feb. 14, 2023", 6 pgs.

"International Application Serial No. PCT/US2022/047705, International Preliminary Report on Patentability mailed May 10, 2024", 8 pgs.

"International Application Serial No. PCT/US2022/047705, International Search Report mailed Feb. 7, 2023", 4 pgs.

"International Application Serial No. PCT/US2022/047705, Written Opinion mailed Feb. 7, 2023", 6 pgs.

"The Cutout Template", Snapchat Lens Studio, [Online] Retrieved from the Internet: <URL: https://lensstudio.snapchat.com/templates/world/cutout/>, (Retrieved Mar. 9, 2020), 8 pgs.

Guangxie, Chen, "Pic Cutout—Face Snap Editor", Apple App Store, [Online] Retrieved from the Internet: <URL: https://apps.apple.com/au/app/pic-cutout-face-snap-editor/id897823665>, (Retrieved on Mar. 9, 2020), 3 pgs.

Rolfe, Tom, "Snap Happy: Using Snapchat as a Photo Editor", TapSmart, [Online] Retrieved from the Internet: <URL: http://www.tapsmart.com/tips-and-tricks/snap-happy-using-snapchat-photo-editor/>, (Oct. 18, 2018), 19 pgs.

Warner, Claire, "How To Use Scissors In Snapchat, Because It's Something You Never Knew You Needed In Your Life", Bustle, [Online] Retrieved from the Internet: <URL: https://www.bustle.com/articles/200096-how-to-use-scissors-in-snapchat-because-its-something-you-never-knew-you-needed-in-your>, (Dec. 14, 2016), 19 pgs.

"U.S. Appl. No. 18/638,019, Non Final Office Action mailed Nov. 21, 2024", 8 pgs.

"U.S. Appl. No. 18/638,019, Notice of Allowance mailed Mar. 18, 2025", 7 pgs.

"U.S. Appl. No. 18/638,019, Response filed Jan. 17, 2025 to Non Final Office Action mailed Nov. 21, 2024", 9 pgs.

"European Application Serial No. 22812934.2, Response to Communication Pursuant to Rules 161 and 162 EPC Filed Dec. 5, 2024", 16 pgs.

"European Application Serial No. 21771332.0, Communication Pursuant to Article 94(3) EPC mailed Mar. 14, 2025", 8 pgs.

"European Application Serial No. 22813377.3, Response to Communication Pursuant to Rules 161 and 162 EPC Filed Dec. 10, 2024", 18 pgs.

"Korean Application Serial No. 10-2022-7035435, Notice of Preliminary Rejection mailed Oct. 29, 2024", w/ English translation, 15 pgs.

"Korean Application Serial No. 10-2022-7035435, Response filed Dec. 26, 2024 to Notice of Preliminary Rejection mailed Oct. 29, 2024", w/ English Claims, 29 pgs.

ANIMATED CUSTOM STICKER CREATION

CLAIM OF PRIORITY

This application is a continuation of U.S. Provisional patent application Ser. No. 17/514,314, filed on Oct. 29, 2021, the benefit of priority of which is claimed hereby, and which is incorporated by reference herein in its entirety.

TECHNICAL FIELD

The present disclosure relates generally to sending graphical elements in a communication session using a messaging application.

BACKGROUND

As the popularity of social networking grows, social networks are expanding their capabilities. To improve ease of use, social networks are integrating more and more functions such that a user may accomplish many or even most of their computer-based tasks within the social network itself.

BRIEF DESCRIPTION OF THE SEVERAL VIEWS OF THE DRAWINGS

In the drawings, which are not necessarily drawn to scale, like numerals may describe similar components in different views. To easily identify the discussion of any element or act, the most significant digit or digits in a reference number refer to the figure number in which that element is first introduced. Some nonlimiting examples are illustrated in the figures of the accompanying drawings in which.

DETAILED DESCRIPTION

The description that follows includes systems, methods, techniques, instruction sequences, and computing machine program products that embody illustrative examples of the disclosure. In the following description, for the purposes of explanation, numerous specific details are set forth to provide an understanding of various examples. It will be evident, however, to those skilled in the art, that examples may be practiced without these specific details. In general, well-known instruction instances, protocols, structures, and techniques are not necessarily shown in detail.

Typically, messaging systems allow users to exchange text and graphics in messages with each other. To send a graphic in a message, a given user pages through multitude pages of information to find a desired graphical representation that best conveys their message. Once a graphical representation is found, the given user can select the graphical representation to incorporate into the message for transmission to one or more recipients. While these systems work well, the need to select from a pre-defined set of graphical representations and the lack of automation and complexities involved in finding a desired graphical representation is limiting and burdensome on the users, which leads to lack of use and waste of resources. Namely, the users can page through multitude of pages of graphical representations and still not find one that is of interest to share with other users. This limits their ability to share their thoughts and communicate efficiently with other users.

The disclosed techniques improve the efficiency of using the electronic device by allowing users to generate custom animated graphical elements (custom graphics) in a communication session. Namely, the disclosed examples receive, by a messaging application implemented on a first device, an image and receive input that selects a region of the image. The messaging application generates a graphical element that includes the region of the image selected by the input and applies one or more visual effects to the graphical element. The messaging application causes the graphical element to be animated according to a given animation pattern selected from a plurality of animation patterns to generate an animated custom graphic and sends the animated custom graphic with the one or more visual effects from the first device to a second device.

As a result, a user can compose a message with a custom graphical representation and deliver such a message to one or more other participants in a conversation session without having to search through multiple pages of information to find a suitable graphical representation of expression to represent the user's intent. This reduces the overall number of resources required to generate messages in a communication session (e.g., a chat session) and increases the overall appeal of using the messaging application.

Networked Computing Environment

Figure 1:
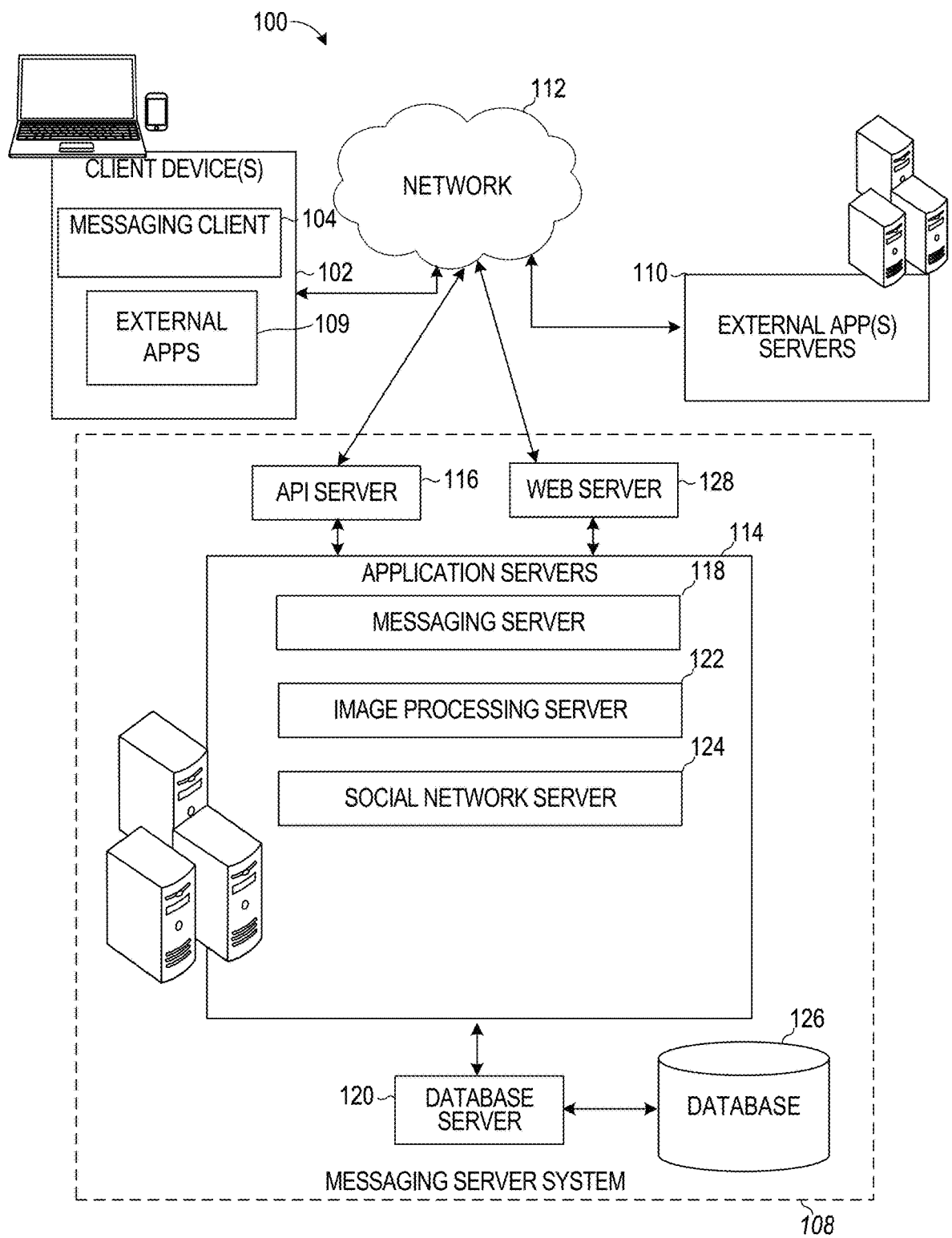
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts several applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally hosted third-party applications, such as external apps 109 using Application Programming Interfaces (APIs).

A messaging client 104 can communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video, or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections; the retrieval of messages and content; the addition and deletion of entities (e.g., friends) to an entity graph (e.g., a social graph); the location of friends within a social graph; and opening an application event (e.g., relating to the messaging client 104).

The application servers 114 host several server applications and subsystems, including, for example, a messaging server 118, an image processing server 122, and a social network server 124. The messaging server 118 implements several message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
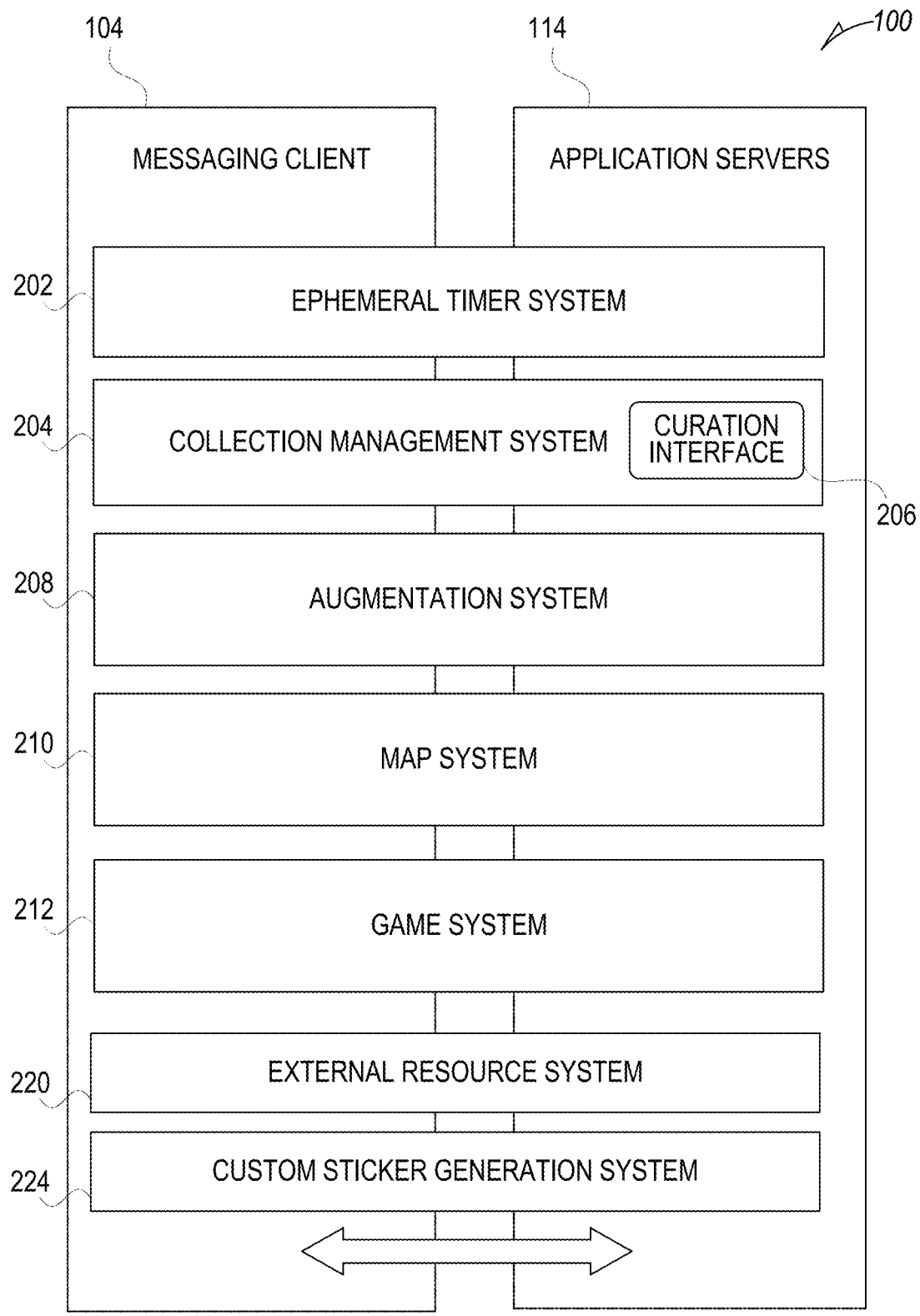
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality (AR) experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification.

Figure 3:
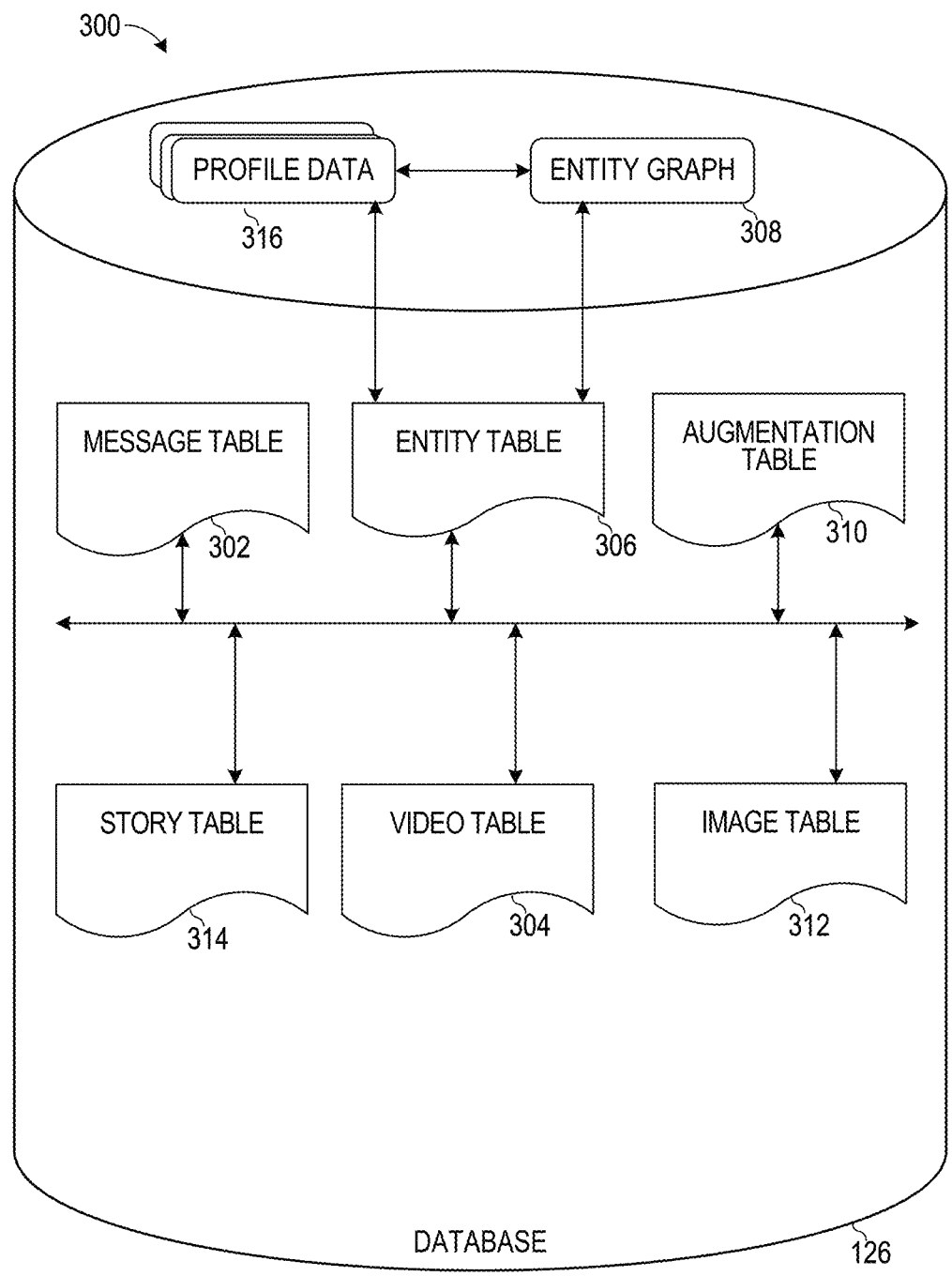
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app") or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving from an external app(s) server 110, a markup-language document associated with the small-scale external application and processing such a document.

In response to determining that the external resource is a locally installed external application 109, the messaging client 104 instructs the client device 102 to launch the external application 109 by executing locally stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The messaging client 104 can present users in a communication session and option to create custom animated graphics, such as animated stickers. The messaging client 104 can present a graphical user interface to a user to select an image from which to generate the animated graphic. In some cases, the messaging client 104 presents the graphical user interface in response to detecting input that selects an option to generate a custom animated graphic.

In some examples, the messaging client 104 can present a list of previously captured images. In some examples, messaging client 104 can present an option to capture a new image. In response to receiving a selection of the option to capture the new image, the messaging client 104 activates a front-facing or rear-facing camera of the client device 102. The messaging client 104 allows the user to capture and store an image or video received from the activated camera of the client device 102. After the image or video is stored, the messaging client 104 can receive input from the user selecting the image or frame of the video for use in generating the animated custom graphic. In some examples, the messaging client 104 presents a search screen allowing the user to browse an external source, such as a website to find a particular image of interest. Once the messaging client 104 receives input that selects the image of interest from the external source, the messaging client 104 allows the user to generate the animated custom graphic from the image of interest.

In some examples, the messaging client 104 enables the user to generate or select a set of frames from a video to use to generate the animated custom graphic. In such cases, the messaging client 104 obtains a video. The messaging client 104 presents the video to the user and detects input, while the video is being played back, requesting to perform a crop operation. In response, the messaging client 104 automatically pauses the video at the current frame that was presented when the crop request was received. The messaging client 104 presents a duration option together with the paused video that allows the user to define the start and end segments of the video. Namely, the messaging client 104 can receive a user selection of the duration option. In response, the messaging client 104 presents a scrubber. The messaging client 104 can receive input that navigates a play head (cursor) of the scrubber to identify a particular frame of the video to use as an image to generate the animated custom graphic. In another example, the messaging client 104 can detect input that selects a clip mode that enables the user to select a subset of frames by trimming a segment of the video. In response to selecting a video segment, the messaging client 104 generates an infinite loop of the video segment and includes the infinitely looping video segment in the custom animated graphic. In such cases, the custom animated graphic depicts a looping video segment and the same features and functions discussed below with respect to images can be applied to the infinitely looping video segment.

In some examples, the messaging client 104 presents a menu of options for generating the custom animated graphic after an image is selected and/or received. The menu of options includes a crop option, an add visual effects (augmented reality elements) option, and an animate option. These options are displayed together with each other and together with the selected image. In some cases, the menu is overlaid on the selected image and in some cases the menu is displayed adjacent to the image.

In some examples, the messaging client 104 receives input that selects the crop option from the menu of options. In response, the messaging client 104 presents a list of different crop styles. The list of different crop styles includes a freehand style (or freestyle) draw option, an automatic selection option, a first shape option (e.g., a rectangular shape), and a second shape (e.g., a circle or ellipse shape). The messaging client 104 can receive a selection of the freestyle draw option. In response, the messaging client 104 receives input (e.g., a touch input or cursor hovered over) at a starting position. The input draws in freestyle a shape around a region of interest. When the messaging client 104 detects that the freestyle shape is completed, such as when the input creates a closed shape by returning to the starting position (e.g., when an oblong shape is drawn), the messaging client 104 extracts, crops or visually distinguishes the region of interest encompassed by the freestyle shape. In one example, a user uses a stencil or finger to draw a shape that encloses a set of pixels. This set of pixels is then used to create the region of interest. In one example, the messaging client 104 dims all the pixels of the image that are outside of the region of interest and brightens the pixels within the region of interest. The messaging client 104 receives input that expands or shrinks (makes smaller) the region of interest. In an example, the messaging client 104 detects a brush gesture or touch inside of the region of interest, and in response the messaging client 104 expands the size of the region of interest. In another examples, the messaging client 104 detects a brush gesture or touch outside of the region of interest, and in response the messaging client 104 shrinks the size of the region of interest. The messaging client 104 can receive input that confirms the region of interest is satisfactory and then the messaging client 104 extracts or crops out the region of interest to delete all the other portions of the image. The extracted or cropped out region of interest is used to create a graphical element that includes the pixels within the cropped out region of interest.

In some cases, the messaging client 104 can detect a two-finger pinch gesture (two-finger touch in which the fingers are brought closer together or spread farther apart). In response, the messaging client 104 can scale and/or rotate the graphical element.

In some examples, the messaging client 104 receives a selection of the automatic selection option. In response, the messaging client 104 processes the selected image to identify one or more objects (e.g., a face of an animal, a body part of a human, or any other suitable distinguishable object or object portion). The messaging client 104 ranks the identified objects and automatically selects one of the identified objects for cropping. In some cases, the messaging client 104 visually highlights each of the identified objects (e.g., by drawing a border of a different color around each of the identified objects). The messaging client 104 can receive input that selects one of the highlighted objects for use in generating the graphical element. The messaging client 104 extracts or crops out the identified object and generates a graphical element that includes the pixels of the cropped out identified object. In some cases, the messaging client 104 can detect a two-finger pinch gesture (two-finger touch in which the fingers are brought closer together or spread farther apart). In response, the messaging client 104 can scale and/or rotate the graphical element.

In some examples, the messaging client 104 receives a selection of the first shape option. In response, the messaging client 104 displays a shape corresponding to the first shape option, such as a rectangle of a predetermined size on top of the image. In some cases, the messaging client 104 automatically searches objects in the image to identify an object that is of a shape that resembles the shape corresponding to the first shape option. Namely, the messaging client 104 searches for a rectangular object and automatically places the shape on top of the identified rectangular object depicted in the image. The messaging client 104 receives input that changes the scale of the shape (e.g., changes the height and/or width of the shape), such as based on a two-finger pinch gesture, and that drags or moves the shape to identify a region of interest. The messaging client 104 can receive input that confirms the region of interest highlighted or enclosed by the selected shape is satisfactory and then the messaging client 104 extracts or crops out the region of interest to delete all the other portions of the image. The extracted or cropped out region of interest is used to create a graphical element that includes the pixels within the cropped-out region of interest. In some cases, the messaging client 104 can detect a two-finger pinch gesture (two-finger touch in which the fingers are brought closer together or spread farther apart). In response, the messaging client 104 can scale and/or rotate the graphical element.

In some examples, the messaging client 104 receives a selection of the second shape option. In response, the messaging client 104 displays a shape corresponding to the second shape option, such as an ellipse or circle of a predetermined size on top of the image. In some cases, the messaging client 104 automatically searches objects in the image to identify an object that is of a shape that resembles the shape corresponding to the second shape option. Namely, the messaging client 104 searches for a circular object and automatically places the shape on top of the identified circular object (e.g., an eye of an animal or person) depicted in the image. The messaging client 104 receives input that changes the scale of the shape (e.g., changes the height and/or width of the shape), such as based on a two-finger pinch gesture, and that drags or moves the shape to identify a region of interest. The messaging client 104 can receive input that confirms the region of interest highlighted or enclosed by the selected shape is satisfactory and then the messaging client 104 extracts or crops out the region of interest to delete all the other portions of the image. The extracted or cropped out region of interest is used to create a graphical element that includes the pixels within the cropped-out region of interest. In some cases, the messaging client 104 can detect a two-finger pinch gesture (two-finger touch in which the fingers are brought closer together or spread farther apart). In response, the messaging client 104 can scale and/or rotate the graphical element.

In some examples, the messaging client 104 receives input that selects the visual effects option. In response, the messaging client 104 displays a list of different visual effects, such as a textual object, a sticker or graphical element, a media item, and/or an outline option. The messaging client 104 enables the user to add text to the graphical element in response to receiving a selection of the textual object from the displayed list. The messaging client 104 enables the user to select the font style, color, size, and position for the text. In some cases, the messaging client 104 analyzes the image to generate one or more attributes for the image that defines objects depicted in the image. The messaging client 104 searches a list of different textual elements to identify one or more textual elements that correspond to the one or more attributes. The messaging client 104 presents the list of different textual elements as a recommendation for the user to select from to add to the graphical element. The messaging client 104 can receive input that modifies a given one of the different textual elements that is added to the graphical element. The messaging client 104 allows the user to specify a position for the textual element (e.g., by dragging the textual element) on top of the graphical element or next to the graphical element.

The messaging client 104 enables a user to also or alternatively add a sticker or graphical element to the graphical element that includes the pixels of the cropped-out region of interest. The messaging client 104 can present a list of different emojis, augmented reality elements, avatars, and so forth for the user to choose from to add to the graphical element. In some cases, the messaging client 104 searches a list of different graphical elements to identify one or more graphical elements that correspond to the one or more attributes. The messaging client 104 presents the list of different graphical elements as a recommendation for the user to select from to add to the graphical element. The messaging client 104 can receive input that modifies a given one of the different graphical elements (e.g., an emoji) that is added to the graphical element. The messaging client 104 allows the user to specify a position for the emoji (e.g., by dragging the emoji) on top of the graphical element or next to the graphical element.

The messaging client 104 enables a user to also or alternatively add a media item to the graphical element that includes the pixels of the cropped-out region of interest. The messaging client 104 can present a list of different media items (e.g., pictures or videos previously stored on the client device 102 or available from a website or other external source) for the user to choose from to add to the graphical element. In some cases, the messaging client 104 searches a list of different graphical elements to identify one or more media items that correspond to the one or more attributes. The messaging client 104 presents the list of different media items as a recommendation for the user to select from to add to the graphical element. The messaging client 104 can receive input that modifies a given one of the different media items (e.g., a picture) that is added to the graphical element. The messaging client 104 allows the user to specify a position for the media item (e.g., by dragging the media item) on top of the graphical element or next to the graphical element.

The messaging client 104 enables a user to also add an outline or alternatively to the graphical element that includes the pixels of the cropped-out region of interest. The messaging client 104 can, in response to selection of the outline option, present a white, yellow, glow or other color border around the graphical element. The messaging client 104 can receive input that modifies the outline, such as by increasing the width and/or changing a color, that is added to the graphical element.

In some examples, the messaging client 104 receives input that selects the animate option. In response, the messaging client 104 displays a list of different animation patterns, such as a bounce animation pattern, a float animation pattern, a mirror animation pattern, a shake animation pattern, a pulse animation pattern, a tile (2D) animation pattern, or a spin animation pattern. In some implementations, the graphical element is animated according to the selected animation pattern independent of any visual effects (e.g., text or media items) that have been added to the graphical element. Namely, the messaging client 104 can animate the region of interest of the graphical element according to the selected animation pattern without moving or animating the visual effects, leaving the visual effects stationary while the graphical element is being animated. In some cases, the entire graphical element and the visual effects are animated together according to the selected animation pattern. In some cases, a first animation pattern can be applied to animate the graphical element according to the first animation pattern and a second animation pattern can be applied to animate the visual effects according to the second animation pattern. In this way, the graphical element can be animated one way or manner while the visual effects are animated in a different way or manner.

In one example, the animation patterns can be toggled ON and OFF by selecting and re-selecting a given animation pattern option. For example, the graphical element can initially be displayed without any animation. The messaging client 104 can receive input that selects a first animation pattern option to apply a first animation pattern to the graphical element. In response, the messaging client 104 animates the graphical element according to the first animation pattern. The messaging client 104 can receive another input that again selects the first animation pattern. In response, the messaging client 104 stops animating the graphical element according to the first animation pattern and applies a new animation pattern or stops animating the graphical element altogether.

The bounce animation pattern causes the graphical element to be animated to move to a first offset position from an initial position along a first direction (e.g., left) by a specified distance. After a threshold period (e.g., 5 milliseconds) of being displayed in the first offset position from the initial position, the graphical element is animated to move to a second offset position along a second direction, opposite the first direction, by the specified distance from the initial position. After the threshold period (e.g., 5 milliseconds) of being displayed in the second offset position, the graphical element is again animated to move to the first offset position. This process of bouncing between the first and second offset positions continues indefinitely.

The mirror animation pattern causes a mirror image of the graphical element to be generated in which the graphical element flips horizontally back and forth at a given time interval. The graphical element is then animated to alternatively be displayed in mirror form and non-mirrored form, such as by displaying the mirror image of the graphical element for a specified period (e.g., 5 milliseconds) and then replacing the display of the mirror image with the non-mirrored or original graphical element. After the specified period (e.g., 5 milliseconds) of displaying the non-mirrored image of the graphical element, the mirrored image version of the graphical element is again displayed. This process of alternatively displaying mirrored and non-mirrored versions of the graphical element continues indefinitely.

The spin animation pattern causes a three-dimensional (3D) version of the graphical element to be generated. For example, the 3D version can be generated by extruding the graphical element to a given thickness. The 3D version of the graphical element is animated to spin around its axis to complete a 360-degree revolution within a specified period (e.g., 3 seconds). The 3D version continues to spin about its own axis at the same rate indefinitely.

The shake animation pattern causes the graphical element to rapidly shift positions in the x and y directions. Specifically, the graphical element is animated to be animated to move to a first offset position from an initial position along a first direction (e.g., left or on the x-axis) by a specified distance. After a threshold period (e.g., 5 milliseconds) of being displayed in the first offset position from the initial position, the graphical element is animated to move to a second offset position along a second direction (e.g., up or on the y-axis) by the specified distance from the first offset position. After a threshold period (e.g., 5 milliseconds) of being displayed in the second offset position, the graphical element is animated to move to a third offset position along a third direction (e.g., right or on the x-axis) by the specified distance from the second offset position. After a threshold period (e.g., 5 milliseconds) of being displayed in the third offset position, the graphical element is animated to move to a fourth offset position along a fourth direction (e.g., down or on the y-axis) by the specified distance from the third offset position. The graphical element repeats being animated to move between the first, second, third, and fourth offset positions indefinitely.

The pulse animation pattern scales the graphical element in and out uniformly along the x and y axis to add emphasis. Namely, the graphical element is animated as incrementally increasing in scale over a threshold period from a first scale to a second scale. After reaching the second scale, the graphical element is animated as incrementally decreasing in scale over the threshold period from the second scale back to the first scale. This process of incrementally increasing and decreasing the scale linearly repeats indefinitely.

The float animation pattern moves the graphical element up and down along the y-axis with easing and a small x-axis movement. Namely, the graphical element is animated as moving along the y-axis from a first position to a second position by a first specified amount while also moving along the x-axis from a third position to a fourth position by a second specified amount (smaller than the first specified amount) over a given time interval. After a threshold period (e.g., 5 milliseconds), the graphical element is animated as moving along the y-axis from the second position back to the first position by the first specified amount while also moving along the x-axis from the fourth position back to the third position by the second specified amount (smaller than the first specified amount) over the given time interval. This process of moving along the x and y axes repeats indefinitely.

The 2D tilt animation pattern rotates the graphical element back and forth along a specified angle on the z-axis. Namely, the graphical element is animated as rotating along the z-axis from a first angle to a second angle by a first specified amount over a given time interval. After a threshold period (e.g., 5 milliseconds), the graphical element is animated as rotating along the z-axis from the second angle back to the first angle by the first specified amount over the given time interval. This process of rotating along the z-axis repeats indefinitely.

After the messaging client 104 applies the visual effects and selected animation pattern to the graphical element, the messaging client 104 stores the graphical element (with the visual effects and animation pattern) as an animated custom graphic in a list of graphical elements. The list of graphical elements is associated with a user account of the messaging client 104. The messaging client 104 allows the user to select an option to share one or more of the graphical elements in the list with one or more other users, such as in a chat or other communication session.

In some examples, the messaging client 104 allows a user to specify attribution parameters for the animated custom graphic. For example, the messaging client 104 can display attribution control information that includes a first option to remain anonymous as a creator of the animated custom graphic and a second option to share limited information about a user who created the animated custom graphic. The messaging client 104 associates the attribution control information with the animated custom graphic based on whether the first option or the second option was selected. For example, if the messaging client 104 detects that the first option was selected, the messaging client 104 prevents other users of the messaging client 104 from accessing a name, identifier, avatar, username, or other identifying information of the user who created the animated custom graphic. If the messaging client 104 detects that the second option was selected, the messaging client 104 enables other users of the messaging client 104 to view or access a name, identifier, avatar, username, or other identifying information of the user who created the animated custom graphic.

In some examples, the messaging client 104 allows the creator of the animated custom graphic (or other users or recipients of the animated custom graphic) to associate one or more keywords with the animated custom graphic. These keywords or tags can be used to simply a search for the animated custom graphic. Namely, the messaging client 104 can receive search input that includes or is associated with the one or more keywords and can then display an identifier of the animated custom graphic that matches the one or more keywords. The messaging client 104 can then allow the user from whom the search input was received to access and share the animated custom graphic with one or more other users.

In some examples, the messaging client 104 enables a user to add the animated custom graphic as an augmented reality element to a real-world environment captured by a camera of the client device 102. In such cases, the messaging client 104 display a video depicting a real-world environment and converts the animated custom graphic to a 3D virtual element. The messaging client 104 adds the 3D virtual element that represents or includes the animated custom graphic to the video and enables the user to adjust a 3D position of the 3D virtual element within the video.

In some cases, the messaging client 104 provides an option to add the animated custom graphic as a 3D virtual element in response to determining that one or more conditions are met. For example, the messaging client 104 can provide the option in response to determining that a first condition that includes a certain quantity of animated custom graphics previously created (and/or shared) by the same user account of the messaging client 104. Namely, the messaging client 104 can increment a counter each time a new animated custom graphic is generated, according to the process above and below, and stored in a list of animated custom graphics. In response to comparing the counter to a specified threshold value (e.g., five) and determining that the counter transgresses (e.g., surpasses, corresponds to, reaches, or exceeds) the specified threshold value (e.g., five), the messaging client 104 determines that the first condition is satisfied and presents an option to add the animated custom graphic to a real-world environment in augmented reality.

As another example, the messaging client 104 can provide the option if a second condition is met in addition to the first condition or as an alternative to the first condition. The second condition can represent a popularity associated with one or more of the animated custom graphics created by a given user account. Specifically, the messaging client 104 can determine several times a particular animated custom graphic has been viewed or shared within a period with other users of the messaging client 104. In response to comparing the number of times with a threshold quantity (e.g., 1000 times) and determining that the number of times transgresses (e.g., surpasses, corresponds to, reaches, or exceeds) the threshold quantity (e.g., 1000 times), the messaging client 104 determines that the second condition is met.

In some cases, in response to determining that one or more of the conditions are met or when all the conditions are met, the messaging client 104 unlocks and enables access to advanced types of visual effects and/or animation patterns. The advanced types of visual effects and/or animation patterns can be used to create or generate additional animated custom graphics and/or to modify previously created animated custom graphics. As an example, the advanced types of visual effects can include a geofilter effect (which adds location specific information to a graphical element (e.g., event information, weather, or GPS coordinates), a caption style (animated or static 3D caption), and a 3D sticker or other 3D elements.

In some cases, in response to determining that one or more of the conditions are met or when all the conditions are met, the messaging client 104 provides an option to purchase access to other features of the messaging client 104. For example, the messaging client 104 provides an option to purchase access to an augmented reality experience creation application or feature associated with the messaging client 104 in response to determining that the first and/or second condition is met. The augmented reality experience creation application enables a user to create an augmented reality experience that causes one or more augmented reality elements to be added to a real-time or stored video feed. The augmented reality experience can be shared with one or more other users.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies several subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates several timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 can communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions), and other payload data (e.g., text, audio, video, or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 can access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

To integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets) and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a graphical user interface of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, three-dimensional (3D) avatars of users, and avatars with various avatar characteristics). Avatar characteristics include different ways to customize a look and feel of an avatar, such as different poses, facial features, clothing, and so forth.

A custom sticker generation system 224 provides a communication interface for generating custom animated graphics. Specifically, the custom sticker generation system 224 enables a user to search for, capture, and/or select an image. The custom sticker generation system 224 allows the user to select a portion of the image to extract and crop out as a graphical element. The custom sticker generation system 224 enables one or more visual effects to be added to the graphical element and one or more animation patterns to be applied to the graphical element. The custom sticker generation system 224 enables a user to store and/or share the graphical element (with the visual effects applied and the animation pattern applied) with one or more other users. An illustrative implementation of the custom sticker generation system 224 is shown and described in connection with FIG. 5 below.

Data Architecture

FIG. 3 is a schematic diagram illustrating data structures 300, which may be stored in the database 126 of the messaging server system 108, according to certain examples. While the content of the database 126 is shown to comprise several tables, it will be appreciated that the data could be stored in other types of data structures (e.g., as an object-oriented database).

The database 126 includes message data stored within a message table 302. This message data includes, for any one message, at least message sender data, message recipient (or receiver) data, and a payload. Further details regarding information that may be included in a message and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interested-based, or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, and settings (e.g., notification and privacy settings), as well as a user-selected avatar representation (or collection of such avatar representations). A particular user may then selectively include one or more of these avatar representations within the content of messages communicated via the messaging system 100 and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). An AR content item or AR item may be a real-time special effect and sound that may be added to an image or a video.

As described above, augmentation data includes AR content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object based on the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
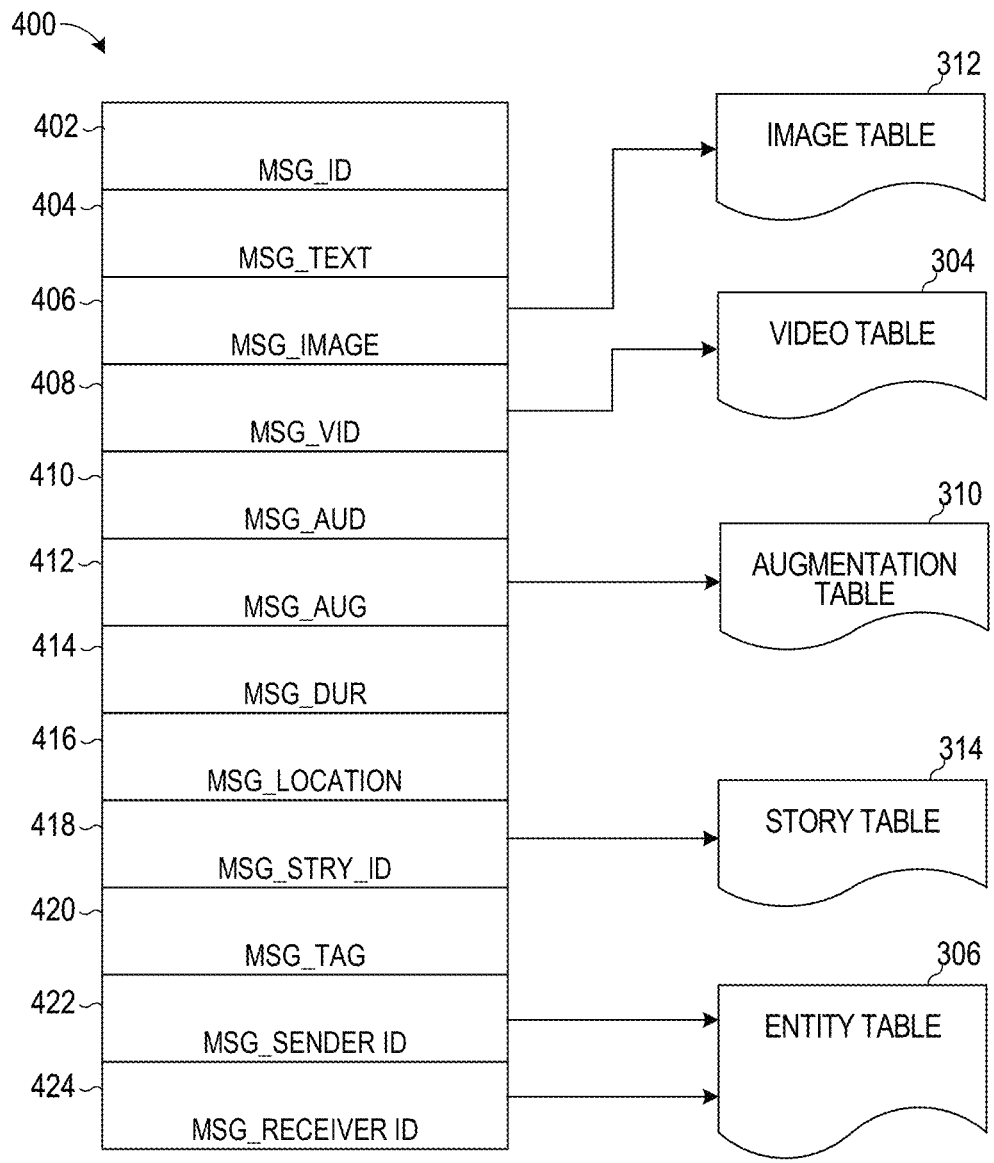
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., stories identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Custom Sticker Generation System

Figure 5:
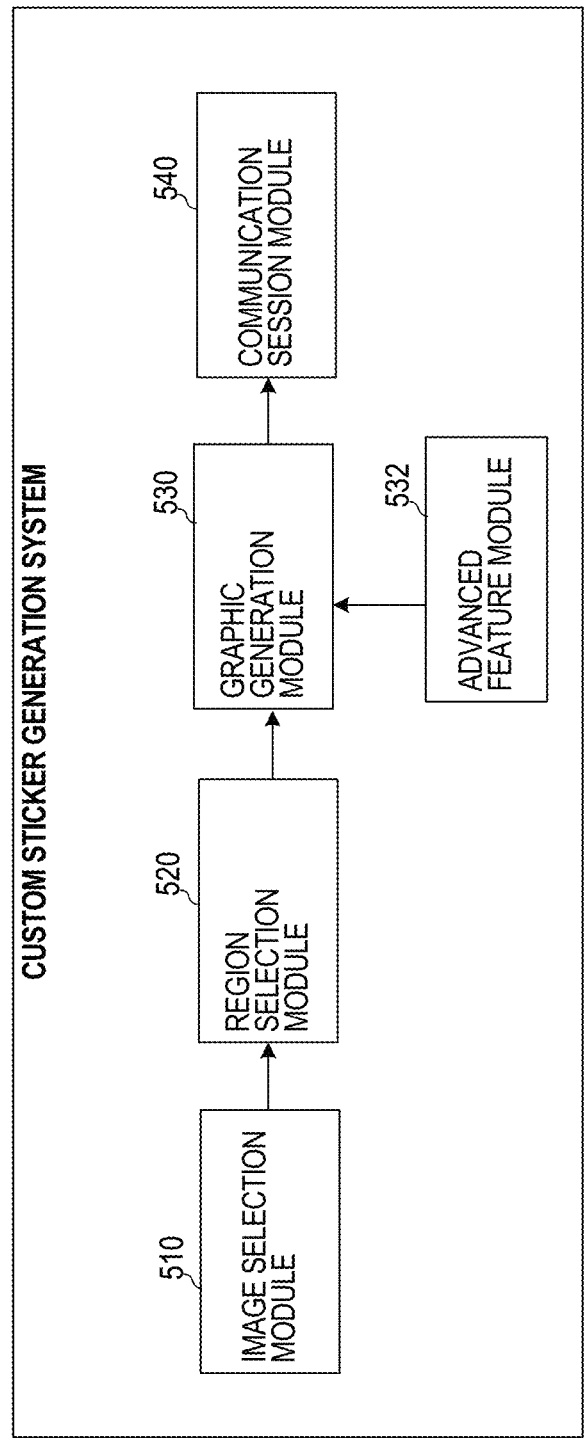
FIG. 5 is a block diagram showing an example custom sticker generation system, according to example examples.

FIG. 5 is a block diagram showing an example custom sticker generation system 224, according to some examples. Custom sticker generation system 224 includes a set of components that operate on a set of input data. The custom sticker generation system 224 includes an image selection module 510, a region selection module 520, a graphic generation module 530, an advanced feature module 532, and a communication session module 540.

The image selection module 510 can present a list of previously captured or received images or vides in a graphical user interface to a user. The image selection module 510 can detect input from a user that selects a given one of the images or videos and requests to generate a custom animated graphic based on the given one of the images or videos (e.g., frame of the video). Once the image selection module 510 receives input that selects the image, the image selection module 510 allows the user to generate the animated custom graphic from the image.

In some examples, image selection module 510 can present an option to capture a new image. In response to receiving a selection of the option to capture the new image, the image selection module 510 activates a front-facing or rear-facing camera of the client device 102. The image selection module 510 allows the user to capture and store an image or video received from the activated camera of the client device 102. After the image or video is stored, the image selection module 510 can receive input from the user selecting the image or frame of the video for use in generating the animated custom graphic. Once the image selection module 510 receives input that selects the image, the image selection module 510 allows the user to generate the animated custom graphic from the image.

In some examples, the image selection module 510 presents a search screen allowing the user to browse an external source, such as a website to find a particular image of interest. Once the image selection module 510 receives input that selects the image of interest from the external source, the image selection module 510 allows the user to generate the animated custom graphic from the image of interest.

Figure 6:
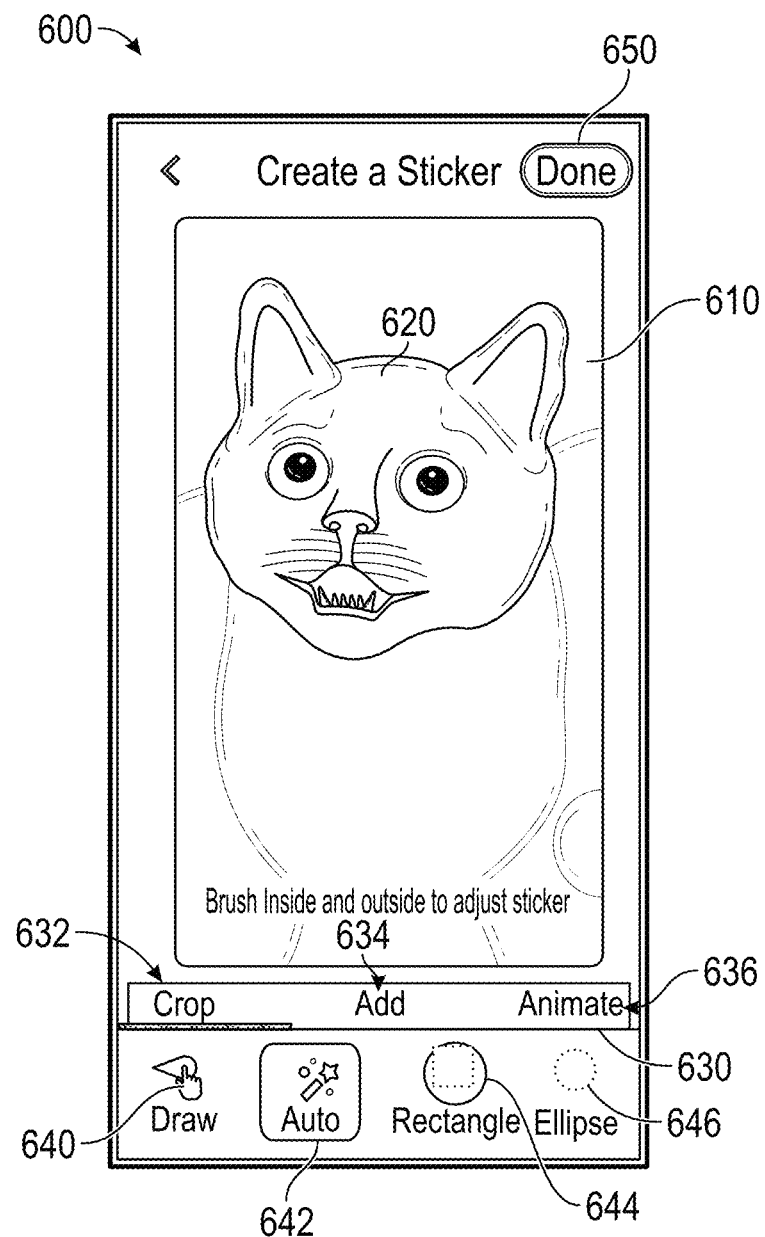
FIGS. 6, 7, and 8 are diagrammatic representations of outputs of the custom sticker generation system, in accordance with some examples.

The image selection module 510 communicates the selected image to the region selection module 520. For example, as shown in FIG. 6, a graphical user interface 600 is presented that depicts an image 610 selected by a user for defining an animated custom graphic. In one implementation, the region selection module 520 can present a menu of options that includes a crop option, an add visual effects (augmented reality elements) option, and an animate option. These options are displayed together with each other and together with the selected image. In some cases, the menu is overlaid on the selected image and in some cases the menu is displayed adjacent to the image. For examples, as shown in FIG. 6, the graphical user interface 600 includes a menu of options 630 including a crop option 632, an add visual effects option 634, and an animate option 636. The user can navigate between each of these options by tapping or otherwise selecting a respective one of the options to apply a modification to the image 610. When all the desired modifications to the image are performed, the custom sticker generation system 224 receives input that selects a done option 650. This causes the custom sticker generation system 224 to store the custom animated graphic (along with the modifications, such as the visual effects and/or animation patterns) in a list of custom animated graphics associated with a user account. In one example, the custom sticker generation system 224 can allow the user to share the custom animated graphic with one or more other users, such via the communication session module 540, in response to detecting selection of the done option 650.

In some examples, the region selection module 520 receives input from the user defining a particular region of interest from the graphical user interface 600 that is used as a basis for generating the animated custom graphic. For example, in response to detecting selection of the crop option 632 from the graphical user interface 600, the region selection module 520 presents a list of different crop styles including a freehand style (or freestyle) draw option 640, an automatic selection option 642, a first shape option 644 (e.g., a rectangular shape), and a second shape 646 (e.g., a circle or ellipse shape). The freestyle draw option 640 enables the region selection module 520 to receive input (e.g., a touch input or cursor hovered over) at a starting position. The input draws in freestyle or freehand a shape around a region of interest 620. When the region selection module 520 detects that the freestyle shape is completed, such as when the input creates a closed shape by returning to the starting position (e.g., when an oblong shape is drawn), the region selection module 520 extracts, crops or visually distinguishes the region of interest 620 encompassed by the freestyle shape. In one example, a user uses a stencil or finger to draw a shape that encloses a set of pixels. This set of pixels is then used to create the region of interest 620. In one example, the region selection module 520 dims all the pixels of the image that are outside of the region of interest 620 and brightens the pixels within the region of interest 620. The region selection module 520 can receive input that confirms the region of interest 620 is satisfactory and then the messaging client 104 extracts or crops out the region of interest 620 to delete all the other portions of the image 610. The extracted or cropped out region of interest 620 is used to create a graphical element that includes the pixels within the cropped-out region of interest.

After or before the freestyle draw option 640 is selected, the automatic selection option 642 can be selected. In response to detecting selection of the automatic selection option 642, the region selection module 520 processes the selected image 610 to identify one or more objects (e.g., a face of an animal, a body part of a human, or any other suitable distinguishable object or object portion). The region selection module 520 ranks the identified objects and automatically selects one of the identified objects as the region of interest 620 for cropping. In some cases, the region selection module 520 visually highlights each of the identified objects (e.g., by drawing a border of a different color around each of the identified objects). The region selection module 520 can receive input that selects one of the highlighted objects as the region of interest 620 for use in generating the graphical element. The region selection module 520 extracts or crops out the region of interest 620 that includes the identified object and generates a graphical element that includes the pixels of the cropped out identified object.

After or before the freestyle draw option 640 is selected, the first shape option 644 can be selected. In response to detecting selection of the first shape option 644, the region selection module 520 displays a shape corresponding to the first shape option, such as a rectangle of a predetermined size on top of the image 610. In some cases, the region selection module 520 automatically searches objects in the image 610 to identify an object that is of a shape that resembles the shape corresponding to the first shape option 644. Namely, the region selection module 520 searches for a rectangular object and automatically places the shape corresponding to the first shape option 644 on top of the identified rectangular object depicted in the image 610. The region selection module 520 receives input that changes the scale of the shape (e.g., changes the height and/or width of the shape) and that drags or moves the shape to identify and select the region of interest 620. The messaging client 104 can receive input that confirms the region of interest 620 highlighted or enclosed by the selected shape is satisfactory and then the region selection module 520 extracts or crops out the region of interest 620 to delete all of the other portions of the image 610. The extracted or cropped out region of interest 620 is used to create a graphical element that includes the pixels within the cropped out region of interest. In a similar manner, the region selection module 520 enables the region of interest 620 to be identified and selected using a different shape corresponding to the second shape option 646, as discussed above.

The region selection module 520 incorporates pixels within the region of interest 620 into a graphical element. The region selection module 520 communicates the graphical element to the graphic generation module 530. The graphic generation module 530 can apply one or more visual effects and/or one or more animation patterns to the graphical element. For example, the graphic generation module 530 can receive or detect input that selects the visual effects option 634. In response, the graphic generation module 530 displays a user interface 700 (FIG. 7) that enables the user to apply one or more visual effects to the graphical element.

Namely, the graphic generation module 530 can present the graphical element in the user interface. The graphic generation module 530 can present a list of visual effects including a textual effect option 710, a graphical element option 720, a media item option 730, and an outline option 740. In some cases, the graphic generation module 530 communicates with the advanced feature module 532 to determine whether to include one or more advanced visual effects in the list of visual effects. Specifically, the advanced feature module 532 analyzes a set of conditions associated with one or more visual effects to determine whether the set of conditions are satisfied. For examples, the advanced feature module 532 can determine that a first condition in response to determining that a certain quantity of animated custom graphics have been previously created (and/or shared) by the same user account of the messaging client 104. Namely, the advanced feature module 532 can increment a counter each time a new animated custom graphic is generated, according to the process above and below, and stored in a list of animated custom graphics. In response to comparing the counter to a specified threshold value (e.g., five) and determining that the counter transgresses (e.g., surpasses, corresponds to, reaches, or exceeds) the specified threshold value (e.g., five), the advanced feature module 532 determines that the first condition is satisfied. In an implementation, in response to determining that the first condition is satisfied, the advanced feature module 532 instructs the graphic generation module 530 to include in the list of visual effects an option to add the animated custom graphic to a real-world environment in augmented reality, and/or advanced types of visual effects, such as a geofilter effect (which adds location specific information to a graphical element (e.g., event information, weather or GPS coordinates), a caption style (animated or static 3D caption), and a 3D sticker or other 3D elements.

As another example, the advanced feature module 532 can determine that the set of conditions includes a second condition. The second condition can represent a popularity associated with one or more of the animated custom graphics created by a given user account. Specifically, the advanced feature module 532 can determine several times a particular animated custom graphic has been viewed or shared within a period with other users of the messaging client 104. In response to comparing the number of times with a threshold quantity (e.g., 1000 times) and determining that the number of times transgresses (e.g., surpasses, corresponds to, reaches, or exceeds) the threshold quantity (e.g., 1000 times), the advanced feature module 532 determines that the second condition is met. In such cases, the advanced feature module 532 instructs the graphic generation module 530 to include in the list of visual effects advanced visual effects. In some implementations, in response to determining that the set of conditions (or a subset of the set of conditions) is satisfied, the advanced feature module 532 provides an option to purchase access to an augmented reality experience creation application or feature associated with the messaging client 104. The augmented reality experience creation application enables a user to create an augmented reality experience that causes one or more augmented reality elements to be added to a real-time or stored video feed. The augmented reality experience can be shared with one or more other users.

Figure 7:
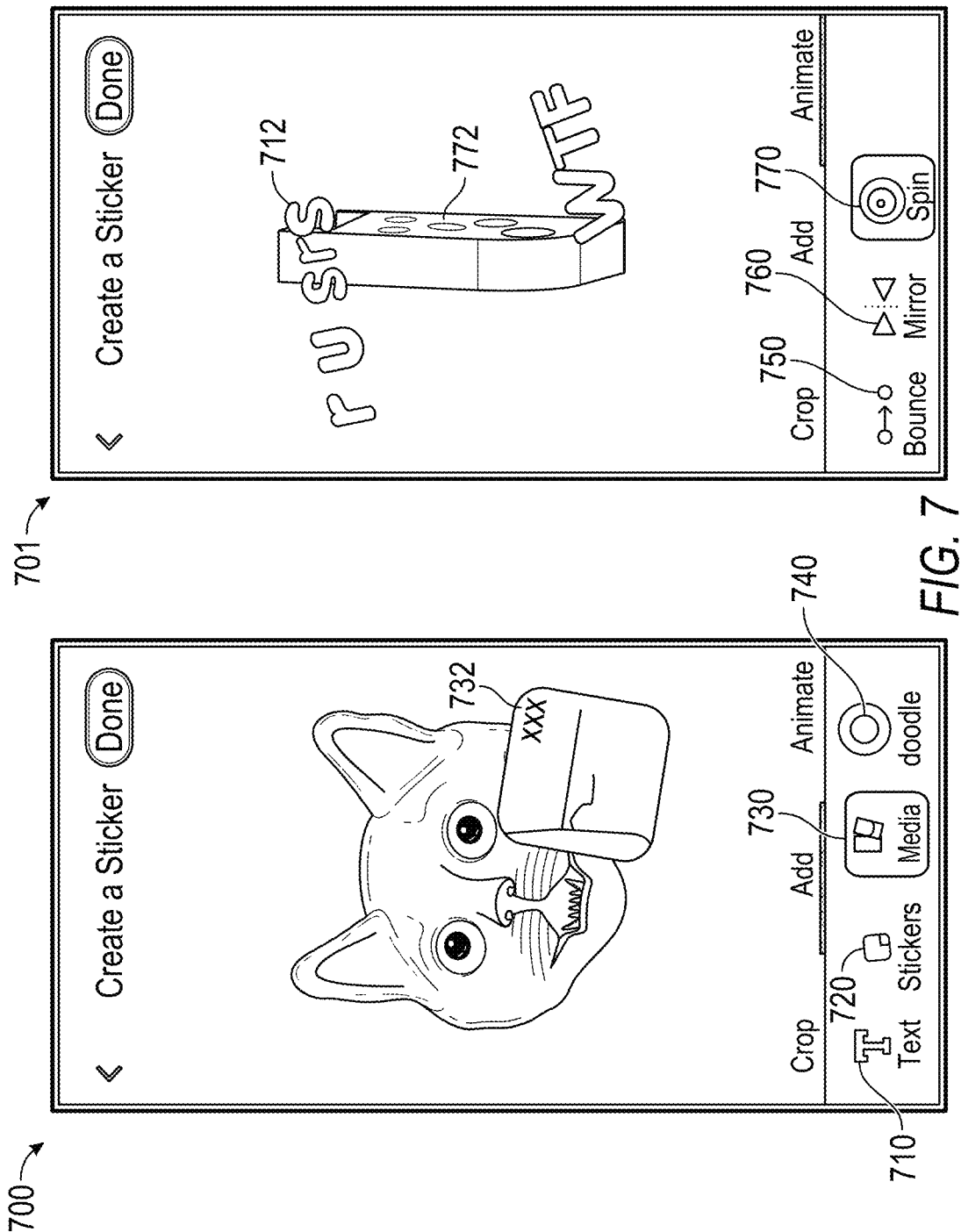

Referring to FIG. 7, the graphic generation module 530 can detect selection of the textual effect option 710. In such cases, the graphic generation module 530 enables the user to add textual content having user selected attributes (color, font, style, location, size, and so forth) to the graphical element. In some implementations, the graphic generation module 530 can process one or more attributes associated with the graphical element shown in FIG. 7 to recommend a set of textual content to associate with the graphical element. The graphic generation module 530 can receive input that changes or selects a given one of the textual content, and adds the textual content to the graphical element shown in FIG. 7.

Similarly, the graphic generation module 530 can detect selection of the graphical element option 720 (e.g., sticker option). In response, the graphic generation module 530 enables the user to add one or more two-dimensional or 3D graphical elements 732 to the graphical element depicted in the user interface 700. In such instances, two graphical elements will be shown in FIG. 7 (one that has been generated based on a selected region of interest 620 from a received image and another graphical element 732 that is selected from a predefined list of graphical elements). The graphic generation module 530 can process one or more attributes associated with the graphical element shown in FIG. 7 to recommend a set of graphical elements 732 to add to the graphical element. The graphic generation module 530 allows the user to specify or change the position of the added graphical element 732.

The graphic generation module 530 can detect selection of the media item option 730. In such cases, the graphic generation module 530 enables the user to add media items (e.g., images or videos) to the graphical element. Namely, the graphic generation module 530 can retrieve a set of previously or recently captured and/or shared media items and present a list of such media items to the user. The graphic generation module 530 can detect selection of a given media item and, in response, the graphic generation module 530 can generate a miniaturized or reduced size version of the selected media item. The graphic generation module 530 can then add the miniaturized or reduced size version of the selected media item to a specified location on the graphical element. In some implementations, the graphic generation module 530 can process one or more attributes associated with the graphical element shown in FIG. 7 to recommend a set of media items to associate with the graphical element. The graphic generation module 530 can receive input that changes or selects a given one of the recommended media items and adds the media item to the graphical element shown in FIG. 7. Any number of media items can be added to the graphical element at any desired positions including overlapping positions.

The graphic generation module 530 can detect selection of the outline option 740. In response, the graphic generation module 530 adds an outline to the graphical element that includes the pixels of the cropped-out region of interest. The graphic generation module 530 can, in response to selection of the outline option, present a white, yellow, glow or other color border around the graphical element. The graphic generation module 530 can receive input that modifies the outline, such as by increasing the width and/or changing a color, that is added to the graphical element.

As shown in user interface 701, the graphic generation module 530 can receive input that selects the animate option 636. In response, a set of different animation patterns (or styles) can be presented including a bounce animation pattern 750, a mirror animation pattern 760, a spin animation pattern 770, or a custom animation pattern (not shown). As discussed above, in response to detecting selection of the bounce animation pattern 750, the graphic generation module 530 causes the graphical element 772 to be animated to move to a first offset position from an initial position along a first direction (e.g., left) by a specified distance without moving or animating one or more visual effects 712 that have been applied (e.g., responsive to selection of the visual effects option 634). After a threshold period (e.g., 5 milliseconds) of being displayed in the first offset position from the initial position, the graphical element 772 is animated to move to a second offset position along a second direction, opposite the first direction, by the specified distance from the initial position again without moving or animating one or more visual effects 712 that have been applied (e.g., responsive to selection of the visual effects option 634). After the threshold period (e.g., 5 milliseconds) of being displayed in the second offset position, the graphical element 772 is again animated to move to the first offset position. This process of bouncing between the first and second offset positions continues indefinitely. In some cases, both the graphical element 772 and the visual effects 712 applied to the graphical element 772 are animated in the same manner and according to the same animation pattern, such as the bounce animation pattern.

As discussed above, in response to detecting selection of the mirror animation pattern 760, the graphic generation module 530 causes a mirror image of the graphical element 772 to be generated. The mirror image of the graphical element 772 can include a mirror image of the visual effects 712 or can include a non-mirrored version of the visual effects 712. The graphical element 772 (independently of the visual effects 712) is then animated to alternatively be displayed in mirror form and non-mirrored form, such as by displaying the mirror image of the graphical element 772 for a specified period (e.g., 5 milliseconds) and then replacing the display of the mirror image of the graphical element 772 with the non-mirrored or original graphical element. After the specified period (e.g., 5 milliseconds) of displaying the non-mirrored image of the graphical element 772, the mirrored image version of the graphical element 772 is again displayed. This process of alternatively displaying mirrored and non-mirrored versions of the graphical element continues indefinitely. In some cases, both the graphical element 772 and the visual effects 712 applied to the graphical element 772 are animated in the same manner and according to the same animation pattern, such as the mirror animation pattern.

As discussed above, in response to detecting selection of the spin animation pattern 770, the graphic generation module 530 generates a 3D version of the graphical element 772 and causes the 3D version of the graphical element 772 to be animated to spin about its axis to complete a 360-degree revolution within a specified period (e.g., 3 seconds). The 3D version continues to spin about its own axis at the same rate indefinitely. In some cases, the graphic generation module 530 causes the 3D version of the graphical element 772 to rotate about its own axis while maintaining the visual effects 712 static. In some cases, both the visual effects 712 and the graphical element 772 rotate or spin about a common axis at the same rate or at different rates. This can result in different animation patterns being applied respectively to the graphical element 772 and the visual effects 712.

The graphic generation module 530 can toggle between the different animation patterns in response to receiving corresponding selections of the different animation pattern options 750, 760, 770. Namely, the graphic generation module 530 can present the graphical element 772 and the corresponding visual effects 712 according to a first animation pattern in response to a first selection of the mirror animation pattern 760 and then can switch to present the graphical element 772 and the corresponding visual effects 712 according to a second animation in response to a second selection of the bounce animation pattern 750.

As discussed above, the graphic generation module 530 can include a set of options that allow a user to specify attribution control information or parameters for the animated custom graphic. The attribution control information can include a first option to remain anonymous as a creator of the animated custom graphic and a second option to share limited information about a user who created the animated custom graphic. The graphic generation module 530 associates the attribution control information with the animated custom graphic based on whether the first option or the second option was selected. For example, if the graphic generation module 530 detects that the first option was selected, the graphic generation module 530 prevents other users of the messaging client 104 from accessing a name, identifier, avatar, username or other identifying information of the user who created the animated custom graphic. If the graphic generation module 530 detects that the second option was selected, the graphic generation module 530 enables other users of the messaging client 104 to view or access a name, identifier, avatar, username, or other identifying information of the user who created the animated custom graphic.

The graphic generation module 530 can also include an interface allowing the user to input one or more keywords to associated with the animated custom graphic. The interface can recommend a set of keywords or tags based on one or more automatically identified attributes of the graphic, such as the attributes or keywords associated with any of the visual effects added to the graphic.

Figure 8:
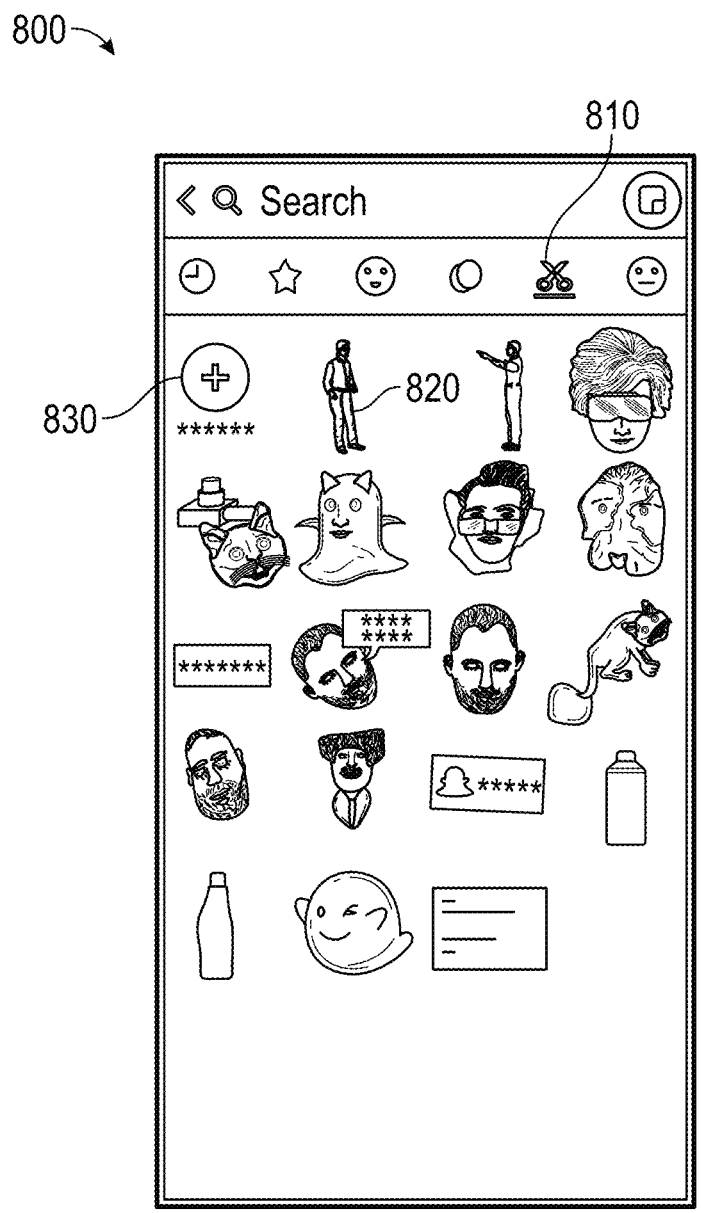

In response to detecting selection of the done option 650 (FIG. 6), the custom animated graphic is stored including the applied visual effects and the animation pattern. In an implementation, the custom animated graphic is stored in a list of previously generated custom animated graphics. For example, as shown in FIG. 8, a graphical user interface 800 presents a list of custom animated graphics. In one example, the graphical user interface 800 is presented in response to receiving a user request to add a graphical element to a chat or communication session between a plurality of participants. The graphical user interface 800 includes an animated custom graphics option 810 that is displayed among other graphic options (e.g., an emoji option, an avatar option, a geolocation option, and so forth). The other graphic options allow the user to select from predetermined graphics that were generated by other users or provided by external sources.

Selection of the animated custom graphics option 810 causes a display to be provided that includes a list of animated custom graphics that were created and associated with a user account of the user. For example, a first animated custom graphic indicator 820 can be presented in response to detecting selection of the animated custom graphics option 810. In response to receiving a selection of the animated custom graphic indicator 820, the previously generated animated custom graphic including the visual effects and animation pattern is retrieved and shared with one or more participants in the communication session (e.g., the chat session). The display provided in response to receiving selection of the animated custom graphics option 810 can include an add option 830. Selection of the add option 830 navigates the user to a user interface (e.g., graphical user interface 600) that enables the user to generate a new animated custom graphic from a new image or video.

FIG. 8 also includes a search box that enables a user to input search terms for finding animated custom graphics. For example, the search terms can be compared with one or more keywords associated with the animated custom graphics. In response to determining that a certain number of keywords match the search terms, the corresponding animated custom graphic indicators of the matching animated custom graphics can be presented in the user interface 800. Any given one of the animated custom graphic indicators can be selected to incorporate a corresponding animated custom graphic into a communication session managed by the communication session module 540. The communication session module 540 establishes a communication session or chat session between a plurality of participants and enables the participants to exchange messages with each other including animated custom graphics.

Figure 9:
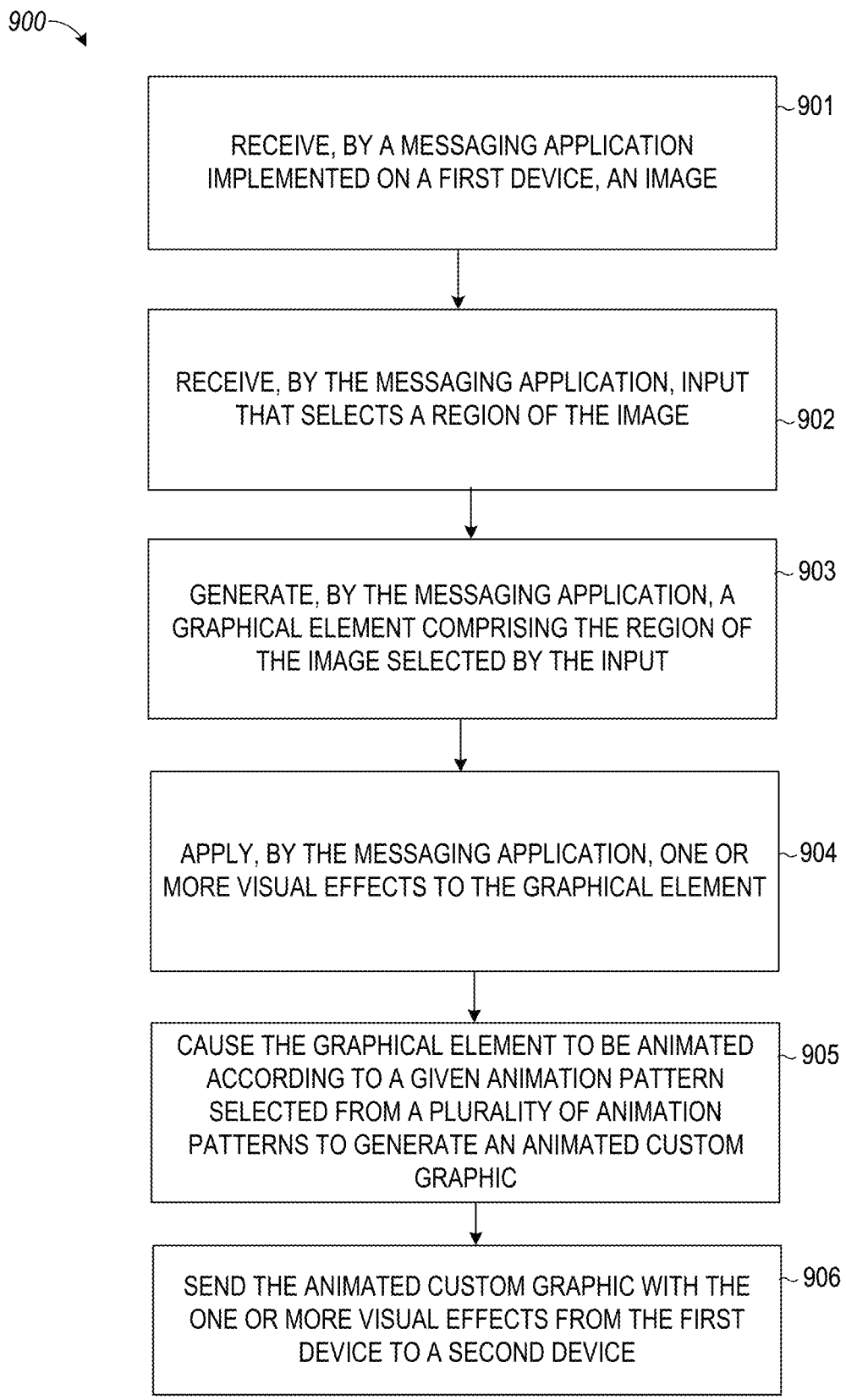
FIG. 9 is a flowchart illustrating example operations of the custom sticker generation system, in accordance with some examples.

FIG. 9 is a flowchart of a process 900 performed by the custom sticker generation system 224, in accordance with some example examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all the steps in other methods, and may be performed by any number of different systems or any portion thereof, such as a processor included in any of the systems.

At operation 901, the custom sticker generation system 224 (e.g., a client device 102 or a server) receives, by a messaging application implemented on a first device, an image, as discussed above. For example, the image selection module 510 receives an input image 610 selected by a user.

At operation 902, the custom sticker generation system 224 receives input that selects a region of the image, as discussed above. For example, the region selection module 520 receives input that selects a region of interest 620 in the image 610, such as in response to selection of the crop option 632.

At operation 903, the custom sticker generation system 224 generates a graphical element comprising the region of the image selected by the input, as discussed above.

At operation 904, the custom sticker generation system 224 applies one or more visual effects to the graphical element, as discussed above. For example, the graphic generation module 530 applies a graphical element 732 as a visual effect selected from a plurality of visual effects, such as a textual, a graphical element, a media item or outline effects.

At operation 905, the custom sticker generation system 224 causes the graphical element to be animated according to a given animation pattern selected from a plurality of animation patterns to generate an animated custom graphic, as discussed above. For example, the graphic generation module 530 applies an animation pattern to the graphical element 772, as shown in the user interface 701 based on an animation pattern selected from a plurality of animation patterns including a bounce animation pattern, a mirror animation pattern and a spin animation pattern.

At operation 906, the custom sticker generation system 224 sends the animated custom graphic with the one or more visual effects from the first device to a second device, as discussed above. For example, the animated custom graphic can be sent by the communication session module 540 to one or more other users or participants in a chat session.

Machine Architecture

Figure 10:
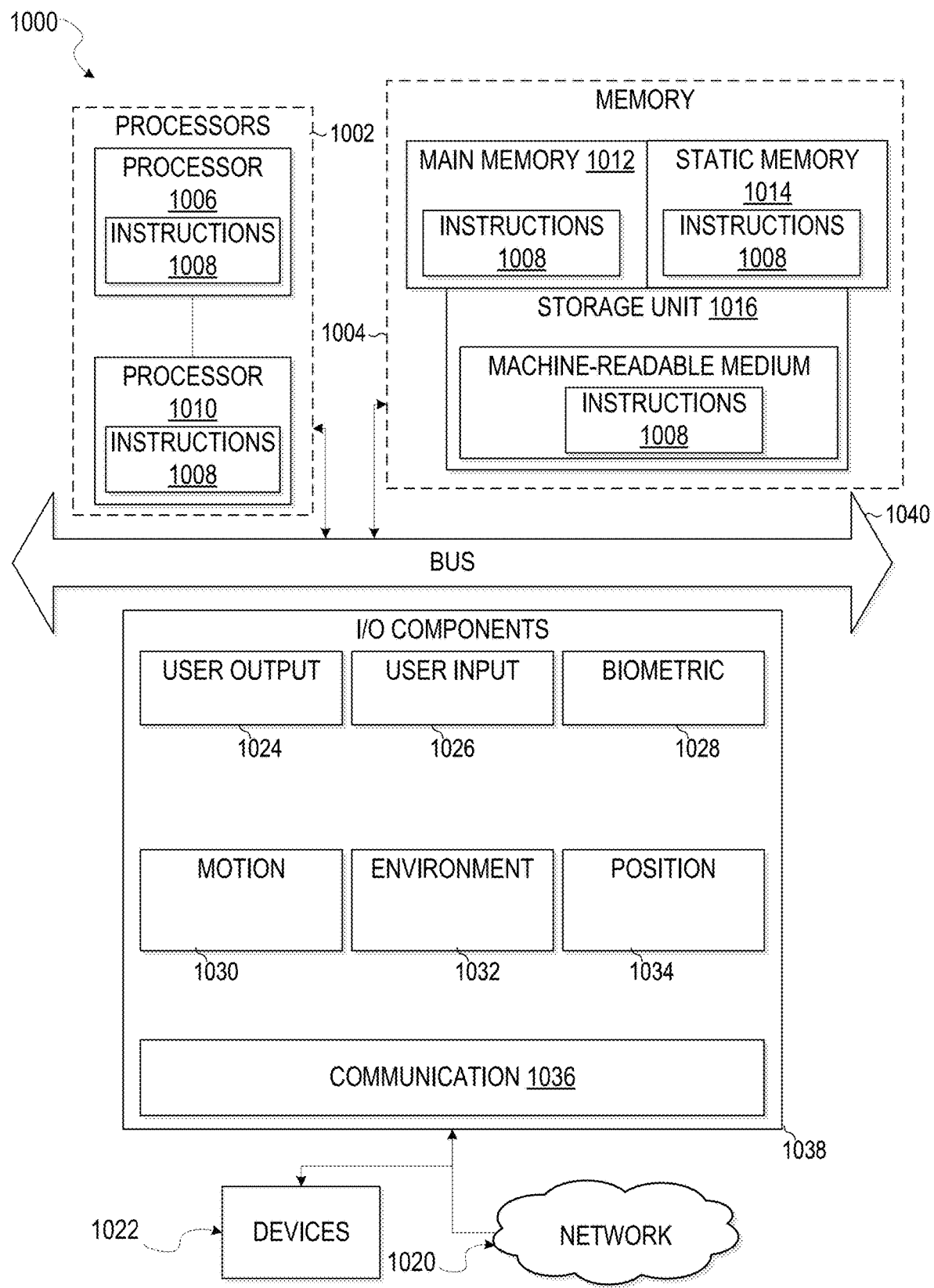
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of several server devices forming part of the messaging server system 108. In some examples, the machine 1000 may also comprise both client and server systems, with certain operations of a particular method or algorithm being performed on the server-side and with certain operations of the method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, and rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., HTTP). Similarly, the instructions 1008 may be transmitted or received using a transmission medium via a coupling (e.g., a peer-to-peer coupling) to the devices 1022.

Software Architecture

Figure 11:
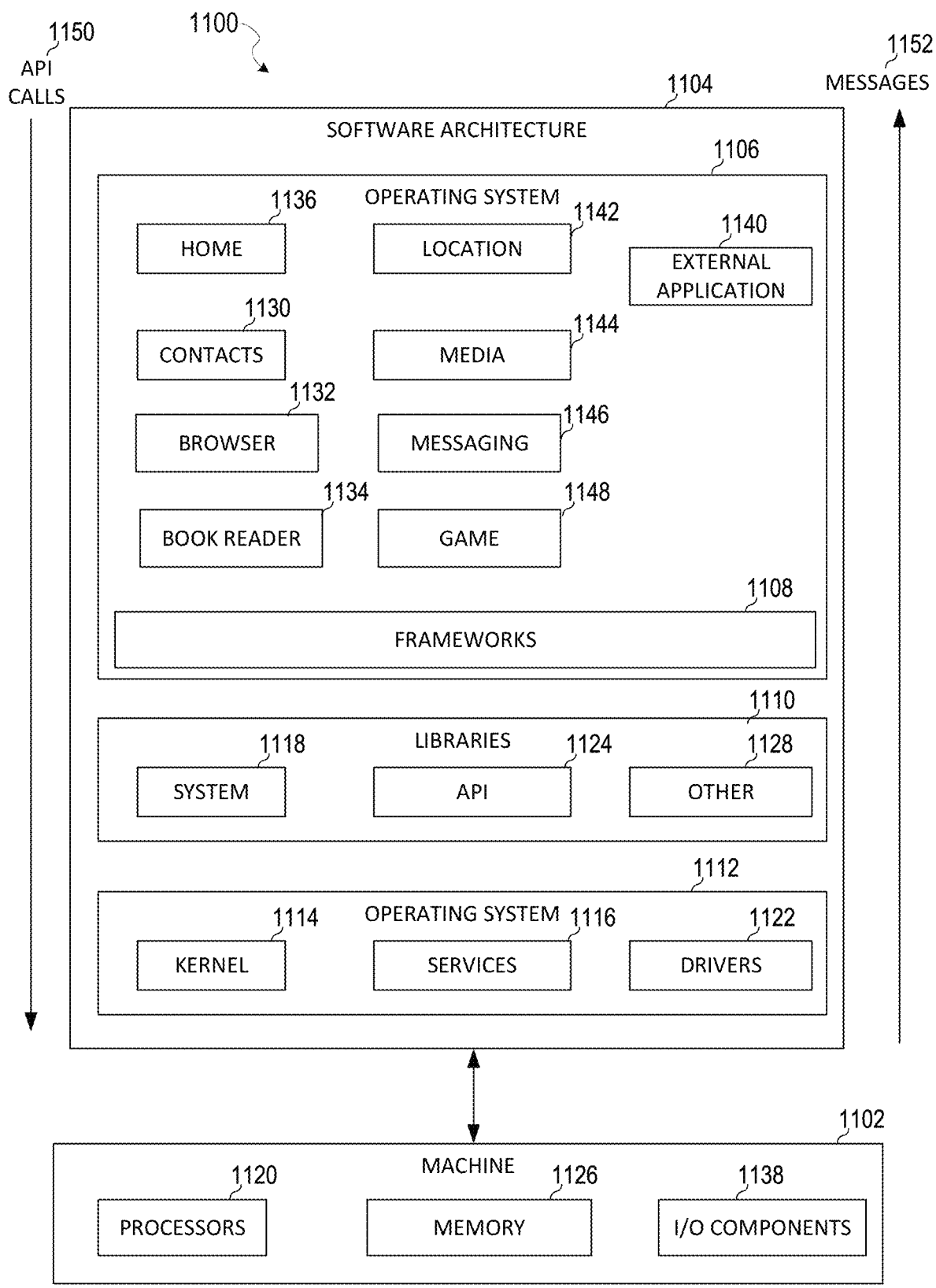
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ SDK by an entity other than the vendor of the platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

Glossary

"Carrier signal" refers to any intangible medium that can store, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistant (PDA), smartphone, tablet, ultrabook, netbook, laptop, multi-processor system, microprocessor-based or programmable consumer electronics, game console, set-top box, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then later access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across several machines. In some examples, the processors or processor-implemented components may be in a single geographic location (e.g., within a home environment, an office environment, or a server farm). In other examples, the processors or processor-implemented components may be distributed across several geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that can store, encoding, or carrying the instructions for execution by a machine.

"Signal medium" refers to any intangible medium that can store, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
generating, by an application, a graphical element comprising a region of an image;
computing a quantity of animated custom graphics previously created by a user account associated with a first device;
determining whether the quantity of the animated custom graphics transgresses a first threshold; and
in response to determining that the quantity of the animated custom graphics transgresses the first threshold, enabling one or more advanced visual effects to be applied to the graphical element by adding the one or more advanced visual effects to a list of visual effects, the one or more advanced visual effects comprising at least one visual effect excluded from the list of visual effects.

2. The method of claim 1, further comprising:
applying, by the application, one or more advanced visual effects of the list of visual effects to the graphical element to add the one or more advanced visual effects relative to the graphical element at one or more user specified positions;
causing the graphical element to be animated according to a given animation pattern selected from a plurality of animation patterns to generate an animated custom graphic; and
sending the animated custom graphic with the one or more advanced visual effects from the first device to a second device.

3. The method of claim 1, further comprising:
storing a counter associated with creation of animated custom graphics associated with the first device;
incrementing the counter each time a new animated custom graphic is generated by the first device and stored in a list of animated custom graphics;
comparing the counter to the first threshold; and
determining that the quantity of the animated custom graphics transgresses the first threshold in response to determining that the counter transgresses the first threshold.

4. The method of claim 1, further comprising:
displaying, by the application, a menu of options comprising a crop option, a visual effects option, and an animation option, the menu of options being displayed together with the image.

5. The method of claim 4, further comprising:
receiving a first selection of the crop option; and
displaying a plurality of crop styles comprising a freehand style, a predefined shape, and an automatic region extraction.

6. The method of claim 5, further comprising:
receiving a second selection of the freehand style;
in response to the second selection, detecting freehand input that draws a shape that defines the region of the image; and
in response to detecting that the shape has been completely drawn when an ending point has reached a starting point of the shape, extracting the region of the image to include in the graphical element.

7. The method of claim 5, further comprising:
receiving a second selection of the automatic region extraction;
in response to the second selection, identifying an object depicted in the image; and
extracting the region of the image to include in the identified object.

8. The method of claim 1, further comprising:
animating the one or more advanced visual effects according to a first animation pattern while the graphical element is animated according to a second animation pattern.

9. The method of claim 1, further comprising:
identifying one or more attributes of the region of the image; and
automatically searching, based on the one or more attributes, a plurality of visual effects to identify and recommend the one or more visual effects.

10. The method of claim 1, further comprising:
displaying, by the application, a plurality of animation patterns, the plurality of animation patterns comprising a bounce animation, a mirror animation, and a spin animation; and
receiving a first selection of a given animation pattern from the displayed plurality of animation patterns, the graphical element being animated independently of the one or more visual effects.

11. The method of claim 1, further comprising storing the animated custom graphic in a list that includes a plurality of previously created animated custom graphics.

12. The method of claim 1, further comprising:
displaying, by the application, a video depicting a real-world environment; and
converting the animated custom graphic to a three-dimensional virtual element.

13. The method of claim 12, further comprising:
adding the three-dimensional virtual element comprising the animated custom graphic to the video.

14. The method of claim 1, further comprising enabling one or more advanced visual effects to be applied to the graphical element in response to determining that one or more conditions are satisfied, the region of the image being selected by user input.

15. The method of claim 1, further comprising:
generating an option to purchase access to an augmented reality experience creation application.

16. The method of claim 1, further comprising:
determining a quantity of users that have viewed or shared a previously generated animated custom graphic that has been created by a user account associated with the application;
determining that the quantity of users transgresses a threshold; and
in response to determining that the quantity of users transgresses the threshold, enabling the advanced visual effects to be applied to the graphical element.

17. The method of claim 14, wherein the one or more conditions comprise a quantity of users who have viewed or shared a previously generated animated graphic created by the user account transgress a second threshold.

18. The method of claim 1, further comprising:
displaying, by the application, attribution control information, the attribution control information comprising a first option to remain anonymous as a creator of the animated custom graphic and a second option to share limited information about a user who created the animated custom graphic; and
associating attribution control information with the animated custom graphic based on whether the first option or the second option was selected.

19. A system comprising:
at least one processor; and
a memory component having instructions stored thereon that, when executed by the at least one processor, cause the at least one processor to perform operations comprising:
generating, by an application, a graphical element comprising a region of an image;
computing a quantity of animated custom graphics previously created by a user account associated with a first device;
determining whether the quantity of the animated custom graphics transgresses a first threshold; and
in response to determining that the quantity of the animated custom graphics transgresses the first threshold, enabling one or more advanced visual effects to be applied to the graphical element by adding the one or more advanced visual effects to a list of visual effects, the one or more advanced visual effects comprising at least one visual effect excluded from the list of visual effects.

20. A non-transitory computer-readable storage medium having stored thereon instructions that, when executed by at least one processor, cause the at least one processor to perform operations comprising:
generating, by an application, a graphical element comprising a region of an image;
computing a quantity of animated custom graphics previously created by a user account associated with a first device;
determining whether the quantity of the animated custom graphics transgresses a first threshold; and
in response to determining that the quantity of the animated custom graphics transgresses the first threshold, enabling one or more advanced visual effects to be applied to the graphical element by adding the one or more advanced visual effects to a list of visual effects, the one or more advanced visual effects comprising at least one visual effect excluded from the list of visual effects.

* * * * *

UNITED STATES PATENT AND TRADEMARK OFFICE
CERTIFICATE OF CORRECTION

Page 1 of 1

PATENT NO. : 12,347,013 B2
APPLICATION NO. : 18/665370
DATED : July 1, 2025
INVENTOR(S) : Goodrich et al.

It is certified that error appears in the above-identified patent and that said Letters Patent is hereby corrected as shown below:

On the Title Page

On page 4, in Column 2, item (56) under "Other Publications", Line 26, delete "22813377.3 ," and insert --22813377.3,-- therefor On page 4, in Column 2, item (56) under "Other Publications", Line 33, delete "malled" and insert --mailed-- therefor Signed and Sealed this
Tenth Day of February, 2026

John A. Squires
*Director of the United States Patent and Trademark Office*